United States Patent [19]
Pinkston, II et al.

[11] Patent Number: 5,557,735
[45] Date of Patent: Sep. 17, 1996

[54] COMMUNICATION SYSTEM FOR A NETWORK AND METHOD FOR CONFIGURING A CONTROLLER IN A COMMUNICATION NETWORK

[75] Inventors: William J. Pinkston, II, Fayetteville, Tenn.; Charles E. Polk, Jr., Athens; Douglas D. Reed, Meridianville, both of Ala.

[73] Assignee: Motorola, Inc., Schaumburg, Ill.

[21] Appl. No.: 278,294

[22] Filed: Jul. 21, 1994

[51] Int. Cl.⁶ .............................. G06F 11/00; G06F 11/30
[52] U.S. Cl. ............... 395/180; 395/182.11; 395/184.01; 395/185.01; 395/182.09
[58] Field of Search ............................... 395/180, 185.01, 395/184.01, 181, 182.01, 182.04, 182.08, 182.09, 182.11, 182.12

[56] References Cited

U.S. PATENT DOCUMENTS

| 4,141,066 | 2/1979 | Keiles | 364/119 |
| 4,958,270 | 9/1990 | McLaughlin et al. | 364/187 |
| 5,088,021 | 2/1992 | McLaughlin et al. | 364/187 |
| 5,235,700 | 8/1993 | Alaiwan et al. | 395/575 |

Primary Examiner—Hoa T. Nguyen
Attorney, Agent, or Firm—J. Ray Wood

[57] ABSTRACT

A data communication system 10 has a controller 14 for managing the system. A controller backup unit (CBU) 24 contains configuration information for the controller 14. If controller 14 is replaced, the new controller 14 obtains the configuration information from the CBU 24.

8 Claims, 2 Drawing Sheets

COMMUNICATION SYSTEM FOR A NETWORK AND METHOD FOR CONFIGURING A CONTROLLER IN A COMMUNICATION NETWORK

TECHNICAL FIELD

This invention relates to data communication systems.

BACKGROUND OF THE INVENTION

Data communication systems include a controller for managing many different types of devices. The controller contains information about all the devices, including itself, communicating through the data communication system. For example, the controller may have baud rate, parity, and flow control information (referred to as "configuration information") about the modems attached to the system. The controller itself has "controller configuration information", such as the controller's network address, control port baud rates, parity settings, textual information (such as a remote units physical location) and other related information related to the controller.

Like every other component of the data communication system, the controller will need to be replaced at some time. Because data communication systems are the lifeblood of modern businesses, the system should continue to provide data communication.

When a controller is replaced while the communication system is operating, the new controller can regain device configuration information from other devices by sending requests to the devices to send their current configuration. However, there is no way for the controller to obtain the controller configuration information.

One way to obtain the controller configuration information is to restart the system. Restarting the entire system is not feasible since a restart requires disconnecting all of the communication devices connected to the system, resulting in a disruption of communication.

One method is to store the controller configuration information in a remote computer. When the controller is replaced, the controller configuration information is loaded from the computer into the controller.

However, due to the additional equipment, such a method is costly. Further, the use of an external device to store information may create problems if the external computer becomes inoperable.

DESCRIPTION OF THE PREFERRED EMBODIMENT

A data communication system stores the controller configuration information in a controller backup unit (CBU). When the controller is replaced, the new controller obtains the controller configuration information from the CBU. A sensor in the controller is used to determine whether the CBU controller configuration information is valid. If the CBU configuration information is valid, then the CBU configuration information is used to configure the controller. If not, then the data communication system restarts.

Figure 1:
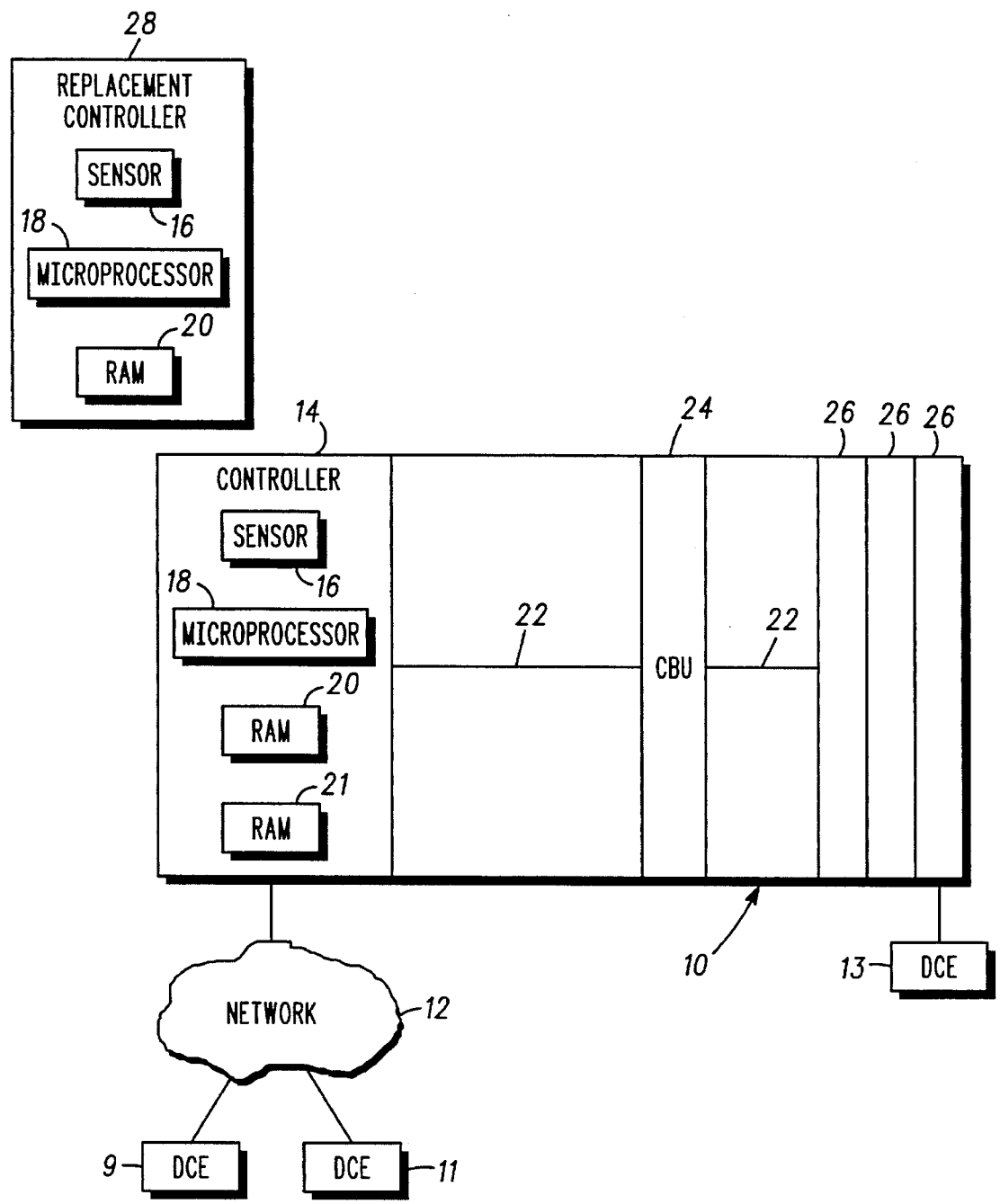
FIG. 1 is a block diagram of a communication system.

FIG. 1 shows a communication system 10 connected to network 12 through controller 14. Controller 14 is coupled to the network by a local area network (LAN) interface. Communication system 10 manages a plurality of DCEs 9, 11, 13. DCEs 9, 11 are coupled to controller 14 through network 12, while DCE 13 is connected directly to the controller 14.

Controller 14 consists of a sensor 16, a processor 18, and non-volatile memory 20. Non-volatile memory consists of battery backed up random access memory. A controller configuration replacement device (CCRD) 21 is provided for replacing the controller configuration information, as hereinafter described.

Controller 14 is coupled to a controller backup unit (CBU) 24 by way of a communication bus 22. Communication bus 22 is a shelf management channel.

Communication bus 22 couples the controller 14 to DCEs (data communication equipment) 26. DCEs 26 could be, for example, modems, voice cards or line interface units. Replacement controller 28 also has a sensor 16, a processor 18 and non-volatile memory 20.

Figure 2:
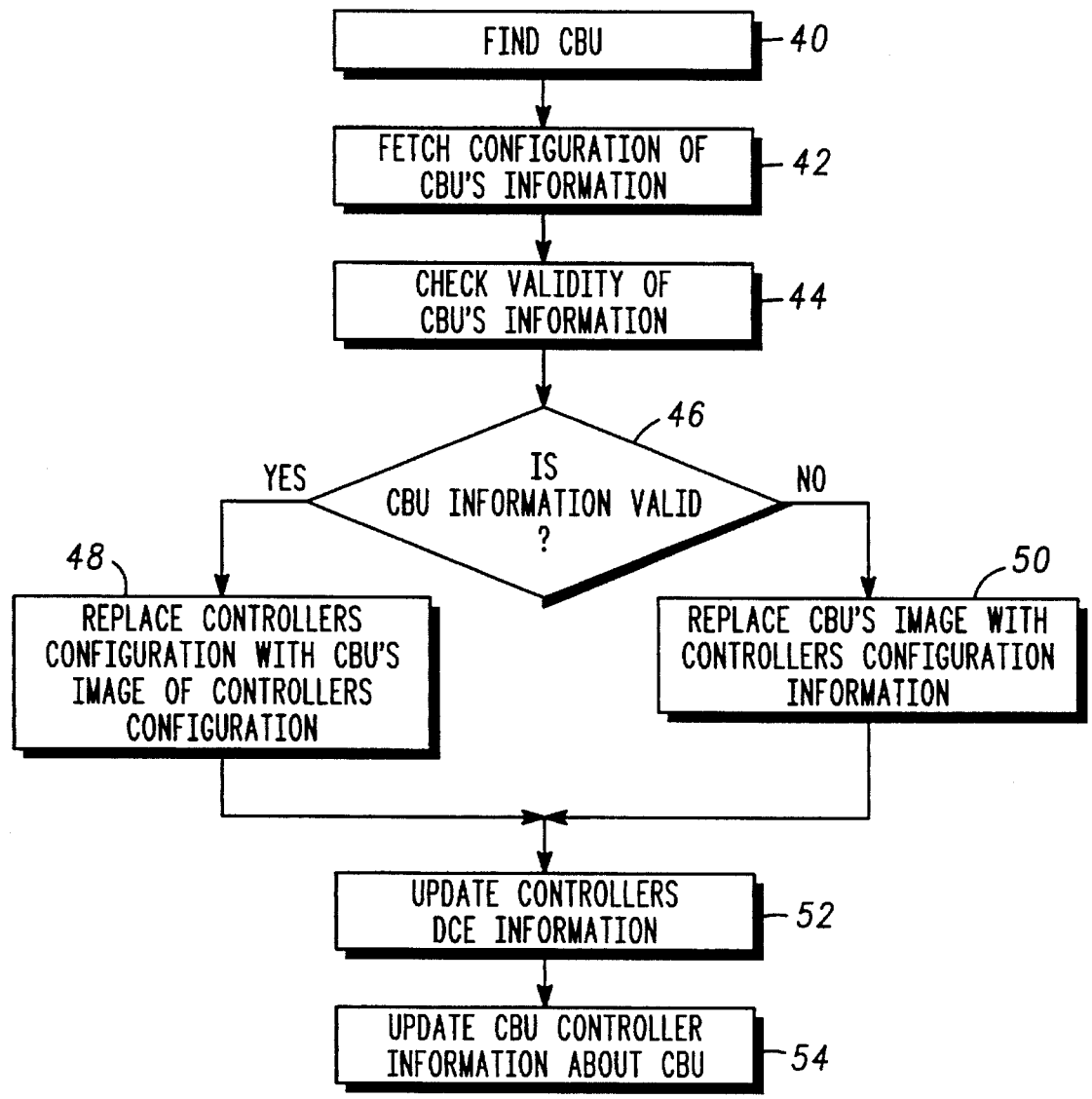
FIG. 2 is a flow chart showing the operation of the communication system.

FIG. 2 is a flow chart for the operation of the system 10. When controller 14 is replaced by a replacement controller 28, the system 10 performs the method shown in FIG. 2.

In step 40, the controller 10 first finds the CBU 24. The controller finds the CBU by obtaining an identification string from each DCE. A predetermined string is compared against each DCE identification string until a match is found indicating a CBU.

Then the controller fetches the CBU's copy of the controller configuration through the communication bus. The controller 10 sends a request to the CBU 42 for controller configuration information. On receipt of the request, CBU 42 sends the controller configuration information to the controller 10.

Controller 10 checks the validity of the configuration information obtained from CBU 24. The validity of the controller configuration information obtained from the CBU is determined by sensor 16. The controller 10 performs a calculation on the received configuration information which results in a data item. The value of the data item indicates validity of the configuration information received from the CBU 24.

If the configuration information from the CBU 24 is valid, then the configuration information in controller 14 is replaced with the CBU's image of the controller's configuration 48 by the controller configuration replacement device 21. The obtained controller information is copied over the controller's configuration in non-volatile memory on the controller.

If the configuration information from the CBU is not sensed valid, then the controller 10 replaces the CBU's 24 image of the configuration information with the controller's configuration information. Step 50. The controller replaces the CBU's image of the controller configuration through protocol on the communication bus.

The controller then updates its DCE information by requesting the configuration information from each device. Step 52.

Finally, the controller 10 updates its information about the CBU 24. The communication system is "stand alone", and does not require an external device to store information. It allows for the changing of the controller while the communication system is operating, thus avoiding any disruption of the data communication system.

We claim:

1. In a network interconnecting DCEs (data communication equipment) a communication system for managing the DCEs access to the network comprising:

a controller coupling the DCEs to the network, the controller connected to the DCEs by way of a communication bus;

the controller having non-volatile memory storing controller configuration information;

a controller backup unit (CBU) coupled to the controller by way of the communciation bus, the CBU having a CBU copy of the controller configuration information, and a sensor for determining whether the CBU copy of the configuration information is valid.

2. The system of claim 1 where the sensor is coupled to the controller by way of the communication bus.

3. The system of claim 1 including a controller configuration replacement device for replacing the controller configuration information with the CBU copy of the controller configuration information in response to the sensor.

4. The sytem of claim 3 where the controller configuration replacement device is enabled when the sensor determines the CBU copy of the controller configuration information is valid.

5. A method of configuring a controller in a communication network managing a plurality of DCEs (data communication equipment) coupled to a communication network, the controller coupled to a a CBU (controller backup unit), the CBU having CBU configuration information, the controller having controller configuration information, the CBU configuration information being a copy of the controller configuration information, the method comprising:

finding the CBU;

fetching the CBU configuration information from the CBU;

checking whether the CBU configuration information is valid: and if the CBU configuration information is valid, replacing the controller configuration information in the controller with the CBU configuration information.

6. The method of claim 5, where the controller has DCE information, further comprising the step of updating the DCE information.

7. The method of claim 6 further comprising the step of if the CBU configuration information is invalid, then replacing the CBU configuration information with the configuration information from the controller.

8. The method of claim 7 further comprising the step, if the controller configuration information is changed, then changing the CBU configuration information.

* * * * *